(12) United States Patent
Villarreal et al.

(10) Patent No.: US 12,516,725 B2
(45) Date of Patent: Jan. 6, 2026

(54) PLANETARY PINION OIL DELIVERY DEVICE

(71) Applicant: TOYOTA MOTOR ENGINEERING & MANUFACTURING NORTH AMERICA, INC., Plano, TX (US)

(72) Inventors: Jaret W. Villarreal, Ann Arbor, MI (US); Gururaj Reddy, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 143 days.

(21) Appl. No.: 18/444,903

(22) Filed: Feb. 19, 2024

(65) Prior Publication Data

US 2025/0264155 A1  Aug. 21, 2025

(51) Int. Cl.
*F16H 57/04* (2010.01)
*F16H 57/08* (2006.01)

(52) U.S. Cl.
CPC ..... *F16H 57/0426* (2013.01); *F16H 57/0479* (2013.01); *F16H 57/082* (2013.01); *F16H 2057/085* (2013.01)

(58) Field of Classification Search
CPC ............. F16H 57/0426; F16H 57/0479; F16H 57/082
See application file for complete search history.

(56) References Cited

U.S. PATENT DOCUMENTS

| 7,422,540 B2 * | 9/2008 | Neudecker | F16H 57/0482 475/331 |
| 7,967,713 B2 * | 6/2011 | Haupt | F16C 33/6677 475/160 |
| 10,240,670 B2 * | 3/2019 | Riedisser | F16H 57/0427 |
| 2007/0111846 A1 * | 5/2007 | Metten | F16H 57/082 475/331 |

(Continued)

FOREIGN PATENT DOCUMENTS

| CN | 118532470 A | * | 8/2024 | ........... F16H 57/082 |
| CN | 118532471 A | * | 8/2024 | ........... F16H 57/082 |

(Continued)

*Primary Examiner* — Michael A Riegelman
(74) *Attorney, Agent, or Firm* — HAYNES AND BOONE, LLP

(57) ABSTRACT

Apparatuses and systems of the present disclosure allow for more efficient delivery of oil to bearings and other rotating components of a planetary gear assembly in a transmission or differential of a vehicle. An oil delivery device that facilitates oil delivery to the rotating components of the planetary gear assembly has a disk shape with opposing axial sides and opposing radial surfaces. The opposing sides and surfaces define a chamber within the oil delivery device that receives oil through an opening extending circumferentially about one side of the oil delivery device and expels oil through an outlet extending through the opposing side. The radially inner, or bottom, surface facilitates retention, and reduces leakage, of oil from within the chamber so that a greater portion of oil received by the oil delivery device is delivered to the moving components of the planetary gear assembly.

20 Claims, 8 Drawing Sheets

(56) References Cited

U.S. PATENT DOCUMENTS

| | | | |
|---|---|---|---|
| 2020/0132186 A1* | 4/2020 | Dombek | F16H 57/082 |
| 2020/0300173 A1* | 9/2020 | Simon | F16H 57/0482 |
| 2020/0332858 A1* | 10/2020 | Dombek | F16H 1/2827 |
| 2024/0093775 A1* | 3/2024 | Schimpf | F16H 57/0427 |
| 2025/0052314 A1* | 2/2025 | Dietrich | F16H 57/0427 |

FOREIGN PATENT DOCUMENTS

| | | | | |
|---|---|---|---|---|
| DE | 102020102241 B3 * | 4/2021 | | F16H 57/0426 |
| DE | 102023125903 A1 * | 3/2025 | | F16H 57/0427 |
| EP | 3056752 B1 * | 6/2020 | | F16C 33/6659 |
| JP | 4527043 B2 | 8/2010 | | |

* cited by examiner

PLANETARY PINION OIL DELIVERY DEVICE

FIELD OF THE DISCLOSURE

The present disclosure relates generally to an oil delivery device and, more particularly, to apparatuses and systems for delivering oil to a bearing of a planetary pinion in a power transmission device of a vehicle.

BACKGROUND

Most vehicle power transmission systems, such as transmissions and differentials, utilize gear assemblies, including planetary gear assemblies, to transmit power between different components of the vehicle. Many of these systems also utilize some form of apparatus or system capable of delivering oil to various moving components, such as gears and bearings, of the power transmission systems. Providing lubrication and cooling to bearings helps preserve the performance and lifespan of the bearings by reducing the impact of wear and tear and friction.

Due to the inherent difficulty in supplying oil to a moving component, the aforementioned oil delivery apparatuses and systems of the prior art only deliver a fraction of the available oil to the bearings or other desired components. In some cases, only a third of the available oil reaches the desired components. As such, there exists a need for an oil delivery apparatus and system that is more efficient at delivering oil to the desired components of a power transmission device.

SUMMARY

In view of the foregoing, the present disclosure provides an oil delivery device, the oil delivery device including: a body having a disk shape with an inner diameter and an outer diameter; first and second side walls of the body, the first and second sides walls defining axially opposing sides of the body and each defining the inner and outer diameter of the oil delivery device; an interior surface extending between the first side wall and the second side wall at the inner diameter of the body; an exterior surface extending between the first side wall and the second side wall at the outer diameter of the body; an oil reception chamber defined within the oil delivery device between the first and second side walls and between the interior and exterior surfaces of the body; an oil inlet opening extending axially through the first side wall between the inner and outer diameters and extending circumferentially about the first side wall, the oil inlet opening being in fluid communication with the oil reception chamber; and an oil outlet port extending axially through the second side wall, the oil outlet port being in fluid communication with the oil reception chamber and the oil inlet opening. In another aspect of the present disclosure, the oil delivery device further includes a nozzle extending axially from the second side wall in a direction opposite the first side wall and extending circumferentially about the oil outlet port such that the oil outlet port extends axially through the nozzle. In another aspect of the present disclosure, the oil inlet opening is radially wider than the oil outlet port. In another aspect of the present disclosure, the first side wall extends from the exterior surface radially inward further than the oil outlet port such that the oil inlet opening and the oil outlet port are radially offset from each other. In another aspect of the present disclosure, the oil delivery device further includes a plurality of oil outlet ports, including the oil outlet port, extending axially through the second side wall and in fluid communication with the oil reception chamber and the oil inlet opening; the plurality of oil outlet ports are equally distributed circumferentially about the second side wall.

The present disclosure also provides an oil delivery system, the oil delivery system including: a planetary gear assembly including: a central gear attached to a power transmission shaft; a planetary carrier coaxially aligned with the central gear; and a planetary gear rotatably attached to a gear shaft via a bearing and rotatably engaged with the central gear, the gear shaft being attached to an oil delivery device via an oil bore defined within the gear shaft; and the oil delivery device having a disk shape and being attached to the planetary carrier such that the oil delivery device, the planetary carrier, and the gear shaft rotate together, the oil delivery device including: first and second walls axially spaced apart from each other; third and fourth walls radially spaced apart from each other, the third wall extending between the first and second walls at an inner diameter of the oil delivery device, and the fourth wall extending between the first and second walls at an outer diameter of the oil delivery device; an oil reception chamber defined within the oil delivery device; an oil inlet opening extending axially through the first wall such that the oil inlet opening is in fluid communication with the oil reception chamber; a nozzle extending axially from the second wall, the nozzle having an oil outlet port extending axially through nozzle and the second wall such that the nozzle and the oil inlet opening are in fluid communication via the oil reception chamber, wherein the nozzle is received within the oil bore of the gear shaft. In another aspect of the present disclosure, the oil inlet opening and the oil outlet port are radially spaced apart such that the oil inlet opening and oil outlet port are not axially aligned with each other. In another aspect of the present disclosure, the oil inlet opening is positioned radially inward relative to the oil outlet port. In another aspect of the present disclosure, the oil delivery device further includes an oil supply port positioned adjacent the oil inlet opening; the oil delivery device is axially spaced apart from the oil supply port such that a narrow flow passage is defined between the oil delivery device and the oil supply port; the narrow flow passage extends between the oil delivery device and the oil supply port to a leakage area; and the narrow flow passage restricts oil communication between the oil delivery device and the leakage area. In another aspect of the present disclosure, the oil inlet opening is radially wider than the oil supply port. In another aspect of the present disclosure, a radially outer end of the oil inlet opening is axially aligned with a radially outer end of the oil supply port; and a radially inner end of the oil inlet opening is located radially inward relative to a radially inner end of the oil supply port. In another aspect of the present disclosure, the planetary gear assembly comprises a second planetary gear rotatably attached to a second gear shaft via a bearing and rotatably engaged with the central gear, the second gear shaft being attached to a second nozzle of the oil delivery device via a second oil bore defined within the second gear shaft; the oil delivery device comprises a second oil outlet port extending axially through the second nozzle and the second wall such that the second nozzle and the oil inlet opening are in fluid communication via the oil reception chamber; the first and second oil outlet ports are equally distributed circumferentially about the second wall. In another aspect of the present disclosure, the oil bore extends axially through the center of the gear shaft. In another aspect of the present disclosure, the oil delivery device further includes an oil pump adapted to pump oil to the oil supply port.

The present disclosure also provides a vehicle, the vehicle including: a propulsion system; a power transmission device operably coupled to the propulsion system and having a planetary gear assembly including: a central gear attached to a power transmission shaft associated with the motor; a planetary carrier coaxially aligned with the central gear; and a planetary gear rotatably attached to a gear shaft via a bearing and rotatably engaged with the central gear, the gear shaft being attached to an oil delivery device via an oil bore defined within the gear shaft; the oil delivery device having a disk shape and being attached to the planetary carrier such that the oil delivery device, the planetary carrier, and the gear shaft rotate together, the oil delivery device including: first and second walls axially spaced apart from each other; third and fourth walls radially spaced apart from each other, the third wall extending between the first and second walls at an inner diameter of the oil delivery device, and the fourth wall extending between the first and second walls at an outer diameter of the oil delivery device; an oil reception chamber defined within the oil delivery device; an oil inlet opening extending axially through the first wall such that the oil inlet opening is in fluid communication with the oil reception chamber; a nozzle extending axially from the second wall, the nozzle having an oil outlet port extending axially through nozzle and the second wall such that the nozzle and the oil inlet opening are in fluid communication via the oil reception chamber, wherein the nozzle is received within the oil bore of the gear shaft. In another aspect of the present disclosure, the propulsion system includes an internal combustion engine and/or an electric motor. In another aspect of the present disclosure, the power transmission device is a transmission or a differential. In another aspect of the present disclosure, the oil inlet opening and the oil outlet port are radially spaced apart such that the oil inlet opening and oil outlet port are not axially aligned with each other. In another aspect of the present disclosure, the oil inlet opening is positioned radially inward relative to the oil outlet port. In another aspect of the present disclosure, a radially outer end of the oil inlet opening is axially aligned with a radially outer end of the oil supply port; and a radially inner end of the oil inlet opening is located radially inward relative to a radially inner end of the oil supply port.

DESCRIPTION OF ILLUSTRATIVE EMBODIMENTS

Illustrative embodiments of the present disclosure are described below as they might be employed in a system for delivering oil to components of a planetary gear assembly. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the disclosure will become apparent from consideration of the following description and drawings.

Figure 1:
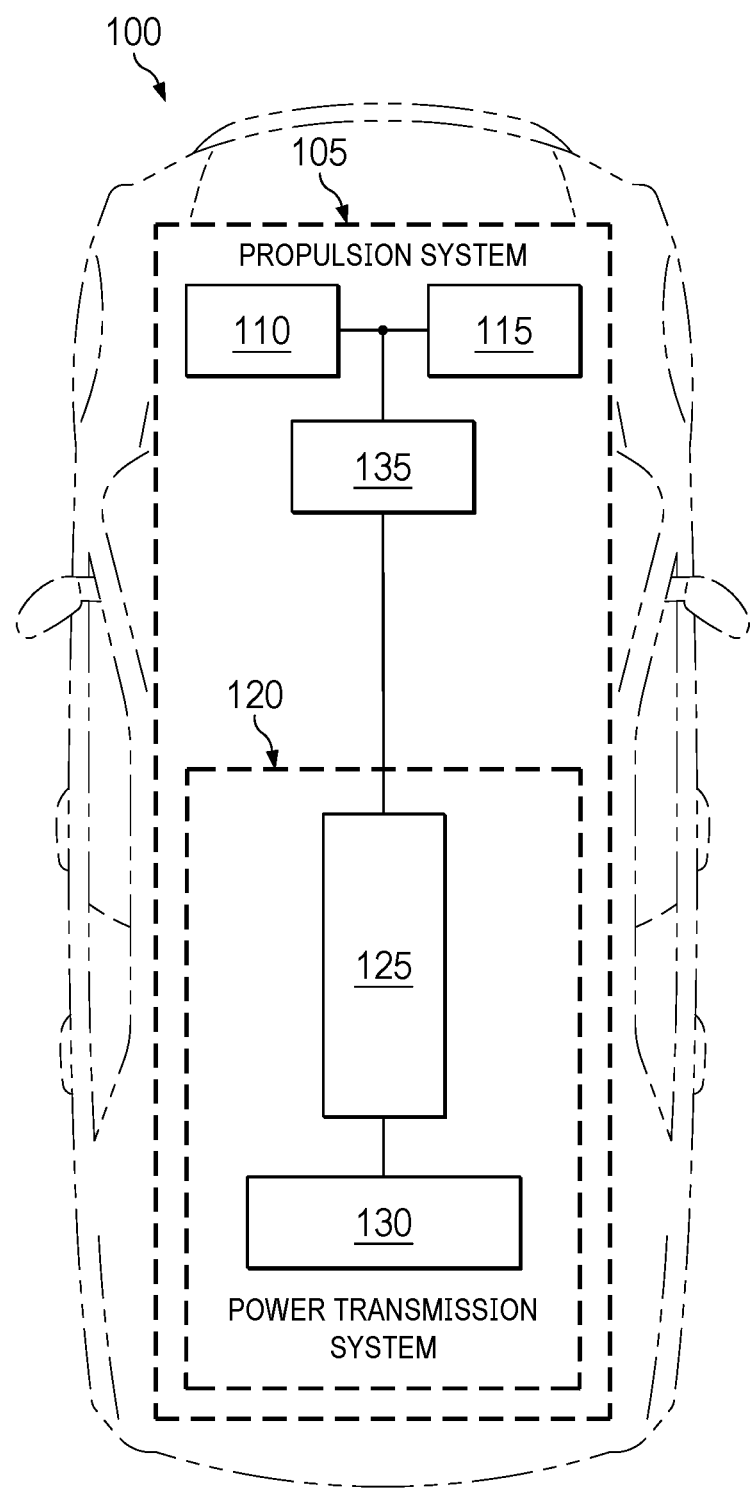
FIG. 1 generally depicts a vehicle including a propulsion system and a power transmission system, according to one or more embodiments of the present disclosure.

FIG. 1 schematically depicts an embodiment of a vehicle 100 including a propulsion system 105. It is noted that, while the vehicle 100 is depicted as an automobile, the vehicle 100 may be any passenger or non-passenger vehicle. The propulsion system 105 of the vehicle 100 includes components operable to accelerate the vehicle 100, as well as maintain its speed. The propulsion system 105 may include an engine 110, a motor 115, a power transmission system 120 including a transmission 125 and a differential 130, and other powertrain components, as well as certain vehicle controls, such as a cruise control system.

The vehicle 100 also includes an oil pump 135 driven by one or more components of the propulsion system 105. The oil pump 135 pumps oil to the various moving components of the propulsion system 105, including the power transmission system 120, in order to facilitate lubrication and cooling of the moving components to improve the performance and lifespan of those components and to reduce the incidence of wear and tear and premature failure.

In one or more embodiments, the vehicle 100 may be a gasoline-powered vehicle, an electric-powered vehicle, or a hybrid vehicle. In one or more embodiments, where the vehicle 100 is a gasoline-powered vehicle, the engine 110 may be an internal combustion engine. In one or more embodiments, wherein the vehicle 100 is an electric-powered vehicle, the motor 115 may be an electric motor. In one or more embodiments, where the vehicle 100 is a hybrid vehicle, the vehicle 100 may include both an internal combustion engine and an electric motor. In one or more embodiments, the vehicle 100 may also include wheels, one or more of which may be powered by one or more components of the propulsion system 105.

In one or more embodiments, the vehicle may also include a vehicle operations system including various vehicle systems, computers, controllers, modules, applications, etc. that cooperate to control and operate the vehicle 100. The vehicle systems may include the propulsion system 105, an energy system, a braking system, a steering system, a signaling system, a stability control system, a navigation system, an audio/video system, for example, as well as any other systems generally available in vehicles. The energy system includes components that control or otherwise support the storage and use of energy by the vehicle 100. The energy source employed by the energy system may include, for example, gasoline, natural gas, diesel oil and the like, as well as batteries, fuel cells and the like.

Figure 2A:
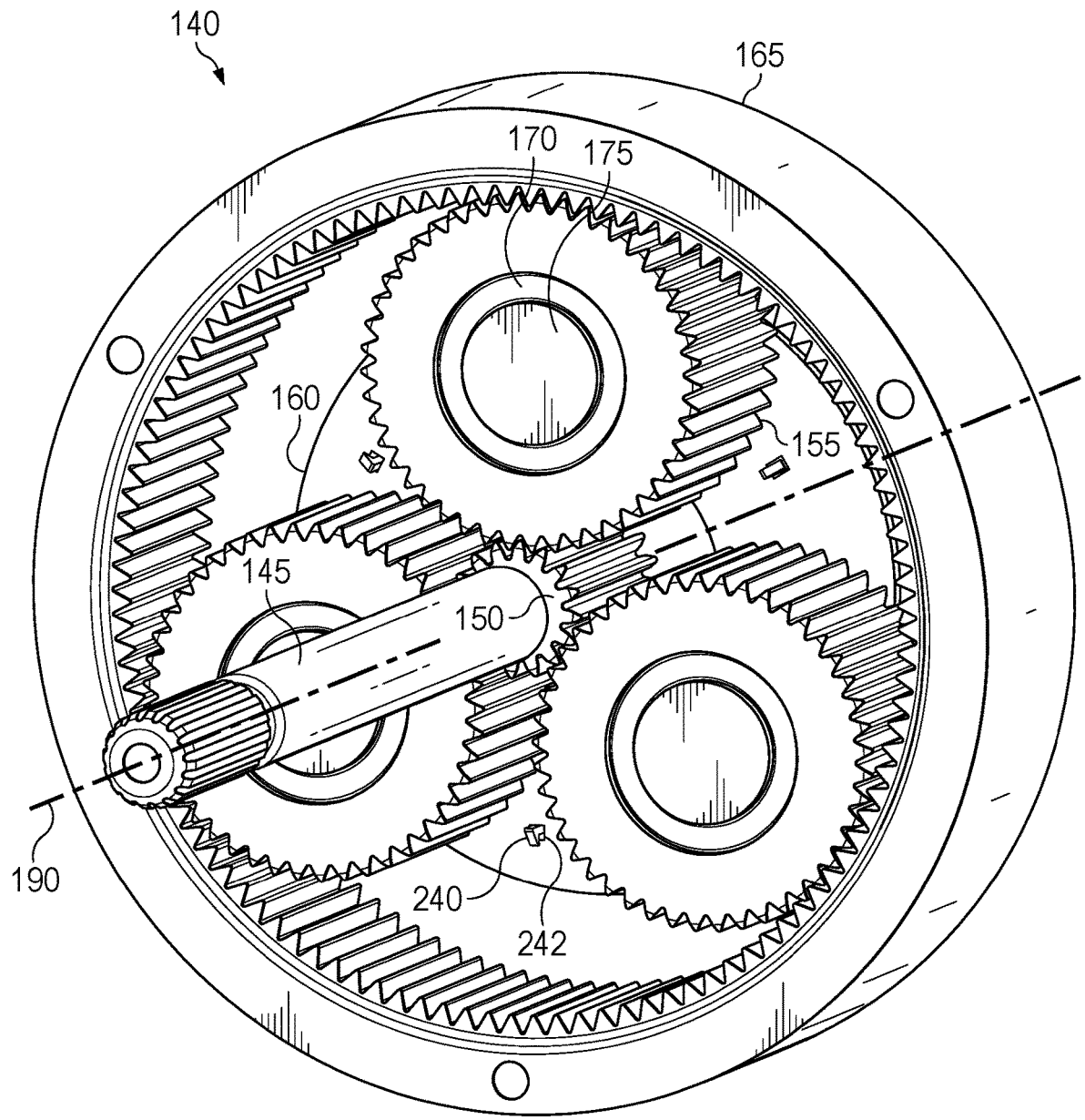
FIGS. 2A and 2B illustrate a planetary gear assembly and an oil delivery device of the power transmission system, according to one or more embodiments of the present disclosure.
Figure 2B:
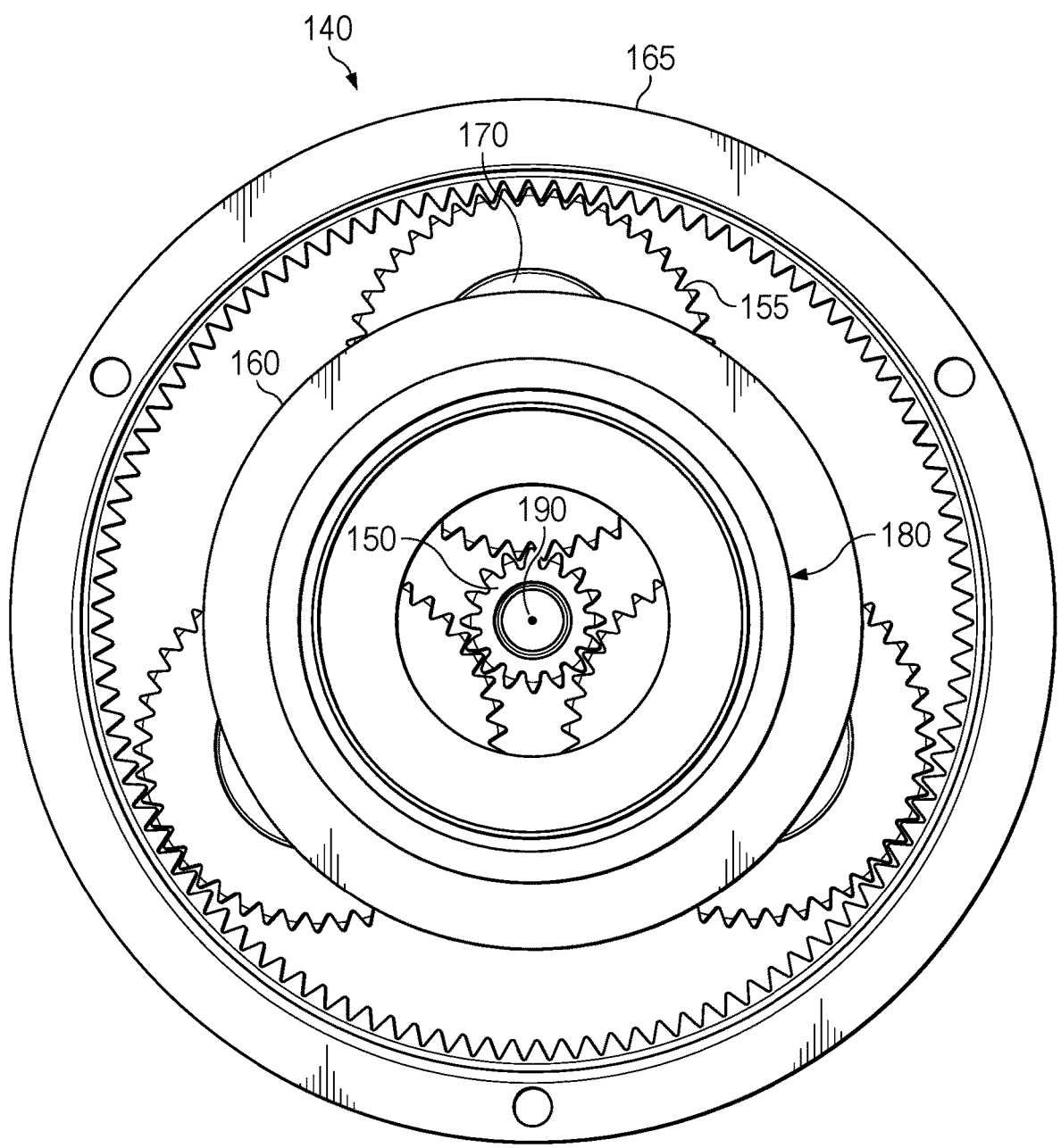

Referring to FIGS. 2A and 2B, a planetary gear assembly 140 of the power transmission system 120 is shown and described. In one or more embodiments, the transmission 125 may utilize the planetary gear assembly 140 to transmit power from the engine 110 or the motor 115. In one or more embodiments, the differential 130 may utilize the planetary gear assembly 140 to transmit power from the engine 110, the motor 115, or the transmission 125.

As shown in FIG. 2A, the planetary gear assembly 140 includes an input transmission shaft 145, a central gear 150 (or "sun gear"), a planetary gear 155 (or "planetary pinion"), a planetary carrier 160, a ring gear 165, and an output transmission shaft (not shown).

The input transmission shaft 145 may be attached to the engine 110, the motor 115, or the transmission 125 at one end and is attached or mounted to the central gear 150 at an opposing end such that the central gear 150 and the input transmission shaft 145 rotate together. The planetary gear 155 is rotatably attached or mounted to the planetary carrier 160 such that the planetary gear 155 rotates with the planetary carrier 160 about an axis 190 centered relative to the planetary carrier 160, but also such that the planetary gear 155 rotates independently of the planetary carrier 160 about an axis centered relative to the planetary gear 155. The planetary gear 155 is also engaged with the central gear 150 such that the planetary gear 155 can be driven or rotated by the central gear 150. The planetary gear 155 is also engaged with the ring gear 165 such that the planetary gear 155 rotates around an interior surface of the ring gear 165. The output transmission shaft is attached or mounted to the planetary carrier 160 such that the output transmission shaft and the planetary carrier 160 rotate together.

In one or more embodiments, the ring gear 165 may be integrated within a housing of the transmission 125 or the differential 130. In one or more embodiments, the planetary carrier 160 may have an outer circumference including gear teeth that engage with the ring gear 165 rather than the planetary gear 155 engaging with the ring gear 165. In one or more embodiments, the planetary carrier 160 may have an outer circumference including a bearing that engages with a sleeve mounted within a housing of the transmission 125 or differential 130.

The planetary gear 155 is rotatably mounted to the planetary carrier 160 via a bearing 170 and a gear shaft 175 (or "pinshaft"). The gear shaft 175 is attached or mounted to the planetary carrier 160 such that the gear shaft 175 and the planetary carrier 160 rotate together. The gear shaft 175, however, does not rotate relative to the planetary carrier 160. In one or more embodiments, the gear shaft 175 extends through the planetary carrier 160. In one or more embodiments, the gear shaft 175 is attached to the planetary carrier 160 via a snap ring or lock ring. In one or more embodiments, the gear shaft 175 is integrally formed with the planetary carrier 160.

The bearing 170 is attached or mounted to the gear shaft 175 such that the bearing 170 circumscribes or extends circumferentially about an exterior surface of the gear shaft 175. In one or more embodiments, the bearing 170 is attached to the gear shaft 175 via tolerance fit, press fit, shrink fit, locking collar, and/or set screws. The planetary gear 155 is attached or mounted to the bearing 170 such that the bearing 170 is positioned between the planetary gear 155 and the gear shaft 175. The planetary gear 155 circumscribes or extends circumferentially about an exterior surface of the bearing 170 and may be attached to the bearing via tolerance fit, press fit, shrink fit, locking collar, and/or set screws. The bearing 170 enables the planetary gear 155 to rotate together with the gear shaft 175 and the planetary carrier 160 about the axis 190 centered relative to the planetary carrier 160, and also enables the planetary gear 155 to rotate independently relative to the gear shaft 175 and the planetary carrier 160 about the axis centered relative to the planetary gear 155, the bearing 170, and the gear shaft 175.

In one or more embodiments, the bearing 170 is a needle bearing. In one or more other embodiments, the bearing 170 may be a deep groove ball bearing, a cylindrical roller bearing, a tapered roller bearing, or other types of bearings depending on the requirements of the application and which would be readily apparent to one of ordinary skill in the art.

In one or more embodiments, the planetary gear assembly 140 may comprise a plurality of planetary gears, each of which is mounted to the planetary carrier 160 as described above via a bearing 170 and a gear shaft 175. In such embodiments, the plurality of planetary gears are equally distributed circumferentially about the planetary carrier 160. In the embodiment shown in FIGS. 2A and 2B, the planetary gear assembly 140 includes three planetary gears equally distributed about the planetary carrier 160.

As further shown in FIG. 2B, the planetary gear assembly 140 further includes an oil delivery device 180. The oil delivery device 180 is adapted to receive oil and deliver it to the bearing 170 in order to lubricate and cool the bearing 170. In one or more embodiments, the oil delivery device 180 may also deliver oil to the other components of the planetary gear assembly 140.

The oil delivery device 180 is attached or mounted to the planetary carrier 160 and rotates with the planetary carrier 160. In one or more embodiments, the planetary carrier 160 is attached to a side of the planetary carrier 160 opposite to a side on which the planetary gear 155 is positioned. In one or more embodiments, the oil delivery device is attached to the planetary carrier 160 via one or more clips and/or fasteners. In one or more embodiments, at least a portion of the oil delivery device 180 attaches to, and extends within, the planetary carrier 160 and the gear shaft 175 in order to deliver oil to the gear shaft 175 and ultimately to the bearing 170.

Figure 3A:
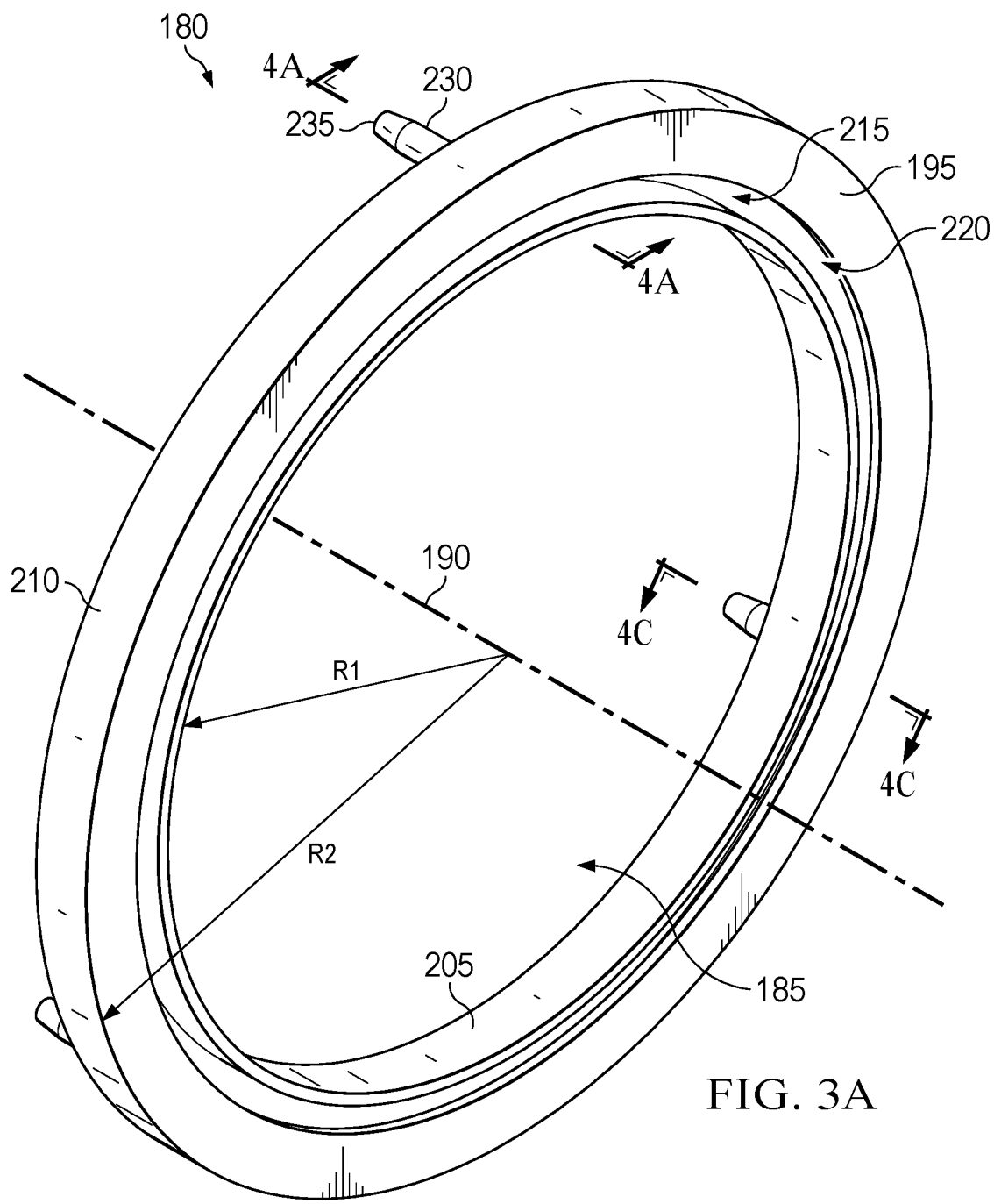
FIGS. 3A and 3B are additional illustrations of the oil delivery device, according to one or more embodiments.
Figure 3B:
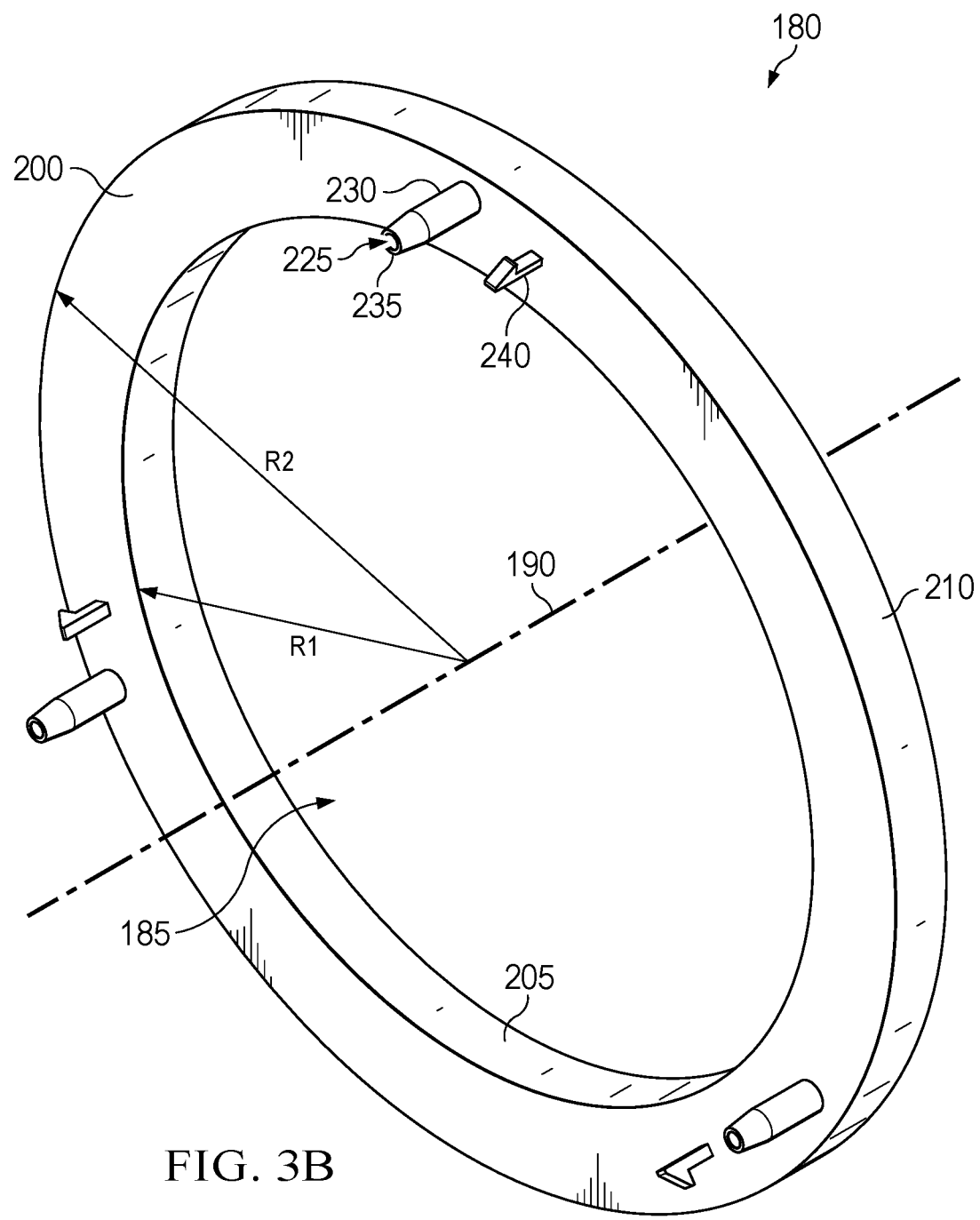

Referring now to FIGS. 3A and 3B, the oil delivery device 180 is shown and described according to one or more embodiments. The oil delivery device 180 has a disk or ring shape with an opening 185 extending axially through the oil delivery device 180 along the axis 190 centered with respect to the planetary carrier 160 and also centered with respect to the oil delivery device 180. The oil delivery device 180 thus has an inner radius R1 (or "inner diameter" or "inner circumference") and an outer radius R2 (or "outer diameter" or "outer circumference") radially spaced apart from the inner radius R1.

The oil delivery device 180 further includes a first side 195 (or "first side wall"), a second side 200 (or "second side wall"), an inner surface 205 (or "interior surface"), and an outer surface 210 (or "exterior surface"). The first side 195 and the second side 200 extend radially and define axially opposing sides of the oil delivery device 180 such that the first side 195 and the second side 200 are axially spaced apart from each other along the axis 190. Each of the first side 195 and the second side 200 have an inner radius and an outer radius corresponding with the inner radius R1 and the outer radius R2 such that the first side 195 and the second side 200 each define the inner radius R1 and the outer radius R2 of the oil delivery device 180.

The inner surface 205 and the outer surface 210 define radially opposing surfaces of the oil delivery device 180 such that the inner surface 205 and the outer surface 210 are radially spaced apart, or radially offset, from each other about the axis 190. The inner surface 205 extends axially between the first side 195 and the second side 200 at the inner radius R1 and extends circumferentially about the axis 190 at the inner radius R1. The outer surface 210 extends axially between the first side 195 and the second side 200 at the outer radius R2 and extends circumferentially about the axis 190 at the outer radius R2.

Defined within the first side 195, the second side 200, the inner surface 205, and the outer surface 210 of the oil delivery device 180 is an oil reception chamber 215 (or "passage"). The oil reception chamber 215 extends circumferentially through the oil delivery device 180 between the first side 195 and the second side 200, and between the inner surface 205 and the outer surface 210. In the embodiment shown, the oil reception chamber 215 extends circumferentially through 360 degrees, or in other words, through the entire oil delivery device 180. In one or more embodiments, the oil reception chamber 215 may extend circumferentially through a portion of the oil delivery device 180. In one or more embodiments, the oil reception chamber 215 may include a plurality of sections equally distributed circumferentially about the oil delivery device 180, each section of the plurality of sections extending circumferentially through a portion of the oil delivery device 180.

Referring to FIG. 3A, the oil delivery device 180 also includes an oil inlet opening 220 that receives oil from an oil supply port, as will be described in more detail below. As shown in FIG. 3A, the oil inlet opening 220 extends axially through the first side 195 of the oil delivery device 180 and extends circumferentially about the first side 195 through 360 degrees, or in other words, circumferentially about the entire first side 195. In one or more embodiments, the oil inlet opening 220 may extend circumferentially about a portion of the first side 195. In one or more embodiments, the oil inlet opening 220 may include a plurality of sections equally distributed circumferentially about the first side 195. In one or more embodiments, where the oil delivery device 180 includes the plurality of sections of the oil reception chamber 215 and the plurality of sections of the oil inlet opening 220, the number of sections of each of the oil reception chamber 215 and of the oil inlet opening 220 may be the same, and each section of the oil reception chamber 215 may be sized equally and circumferentially aligned with a respective section of the oil inlet opening 220 about the oil delivery device 180. In other words, the circumferential length and the circumferential position of the oil reception chamber 215 and of the oil inlet opening 220 with respect to the oil delivery device 180 are equal and aligned, respectively. The oil reception chamber 215, the oil inlet opening 220, and their relation to each other are more clearly illustrated in FIGS. 4A-4C.

In the embodiment shown, a radial height of the of oil reception chamber 215 and a radial height of the oil inlet opening 220 are not equal. In one or more embodiments, as will be described in more detail below, the radial height of the oil reception chamber 215 is greater than the radial height of the oil inlet opening 220.

Referring to FIG. 3B, the oil delivery device 180 further includes an oil outlet port 225 that delivers oil from the oil reception chamber 215 to the gear shaft 175 and ultimately to the bearing 170. The oil outlet port 225 extends axially through the second side 200 and is in fluid communication with the oil reception chamber 215 and with the oil inlet opening 220 via the oil reception chamber 215. The oil outlet port 225 extends through the second side 200 at a point radially between the inner radius R1 and the outer radius R2. In the embodiment shown, the oil delivery device 180 includes three oil outlet ports equally distributed circumferentially about the second side 200, each of which is positioned at the same radial distance from the axis 190. In one or more embodiments, the number of oil outlet ports corresponds to the number of planetary gears in the planetary gear assembly 140. In one or more embodiments, the circumferential distribution and radial position of the oil outlet ports correspond with the circumferential distribution and radial position of the gear shafts, as will be described in more detail below.

The oil delivery device 180 also includes a nozzle 230 that facilitates delivery of oil from the oil reception chamber 215. The nozzle 230 extends axially from the second side 200 of the oil delivery device 180 in a direction opposite from the first side 195. The nozzle 230 extends circumferentially about the oil outlet port 225, or in other words, the oil outlet port 225 extends axially through the nozzle 230 and terminates at a nozzle outlet 235. In one or more embodiments, at least a portion of the nozzle 230 may taper towards the nozzle outlet 235. In the embodiment shown, the oil delivery device 180 includes nozzles equally distributed circumferentially about the second side 200, each of which is positioned at the same radial distance from the axis 190. In one or more embodiments, the number of nozzles corresponds to the number of planetary gears in the planetary gear assembly 140. In one or more embodiments, the circumferential distribution and radial position of the nozzles correspond with the circumferential distribution and radial position of the gear shafts, as will be described in more detail below.

In one or more embodiments, the oil delivery device 180 also includes a mounting clip 240 extending axially from the second side 200. In one or more embodiments, the mounting clip 240 extends parallel to the nozzle 230. In one or more embodiments, the mounting clip 240 is circumferentially offset form the oil outlet port 225 and from the nozzle 230. In one or more embodiments, the oil delivery device 180 may include a plurality of mounting clips equally distributed circumferentially about the second side 200. The mounting clip 240 is adapted to be received through a slot 242 extending axially through the planetary carrier 160, the slot 242 being adapted to retain the mounting clip 240 in order to facilitate attachment of the oil delivery device 180 to the planetary carrier 160.

In one or more other embodiments, rather than a mounting clip, the oil delivery device 180 may include a mounting hole. In such embodiments, the mounting hole may extend axially through the second side 200 and/or through the first side 195. In such embodiments, the mounting hole may be circumferentially offset from the oil outlet port 225 and from the nozzle 230. In such embodiments, the oil delivery device 180 may include a plurality of mounting holes equally distributed circumferentially about the first side 195 or the second side 200. In such embodiments, the mounting hole may be adapted to receive a fastener to attached, or secure, the oil delivery device 180 to the planetary carrier 160.

Figure 4A:
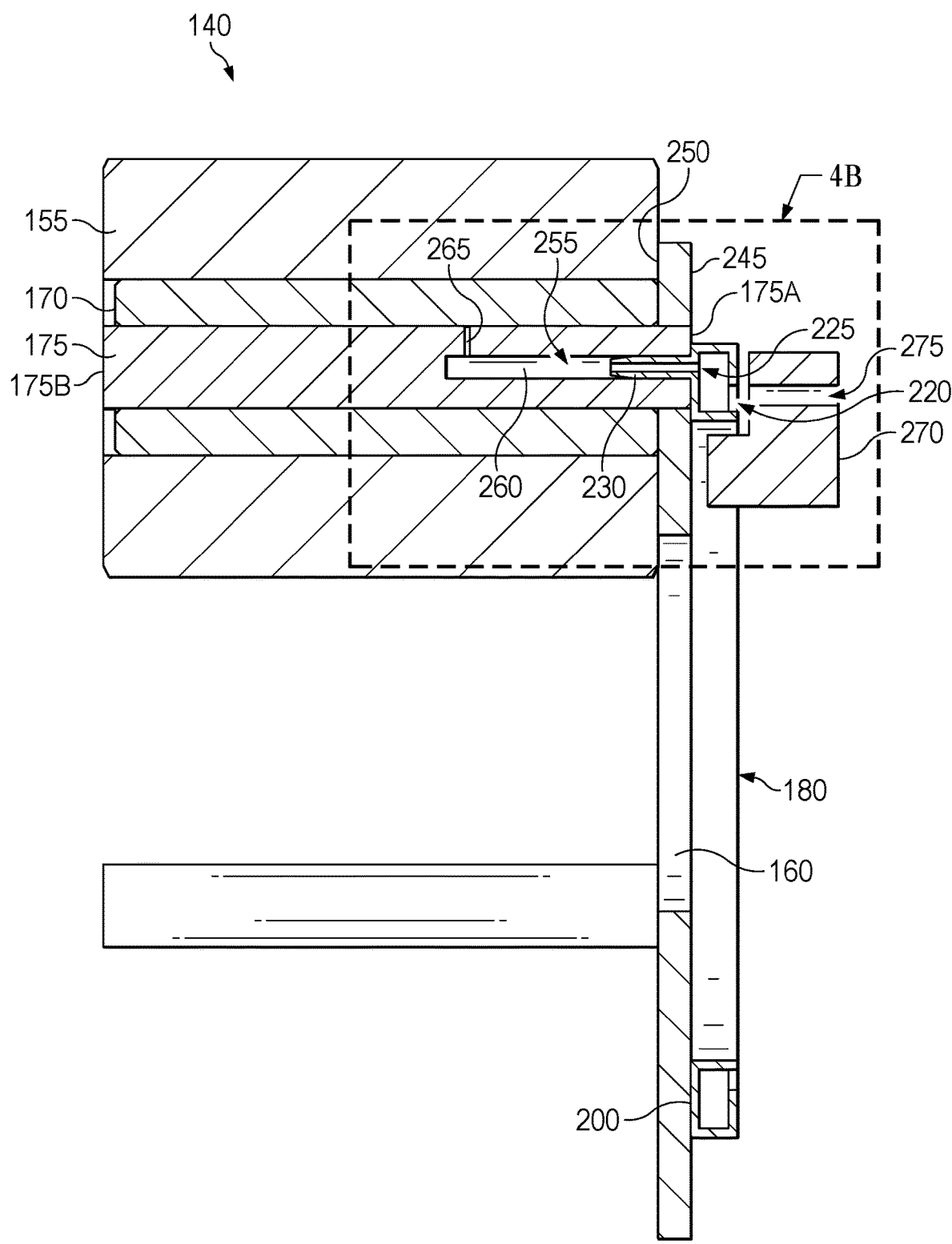
FIGS. 4A and 4B illustrate a cross-sectional view of a portion of the planetary gear assembly and of the oil delivery device, according to one or more embodiments.
Figure 4B:
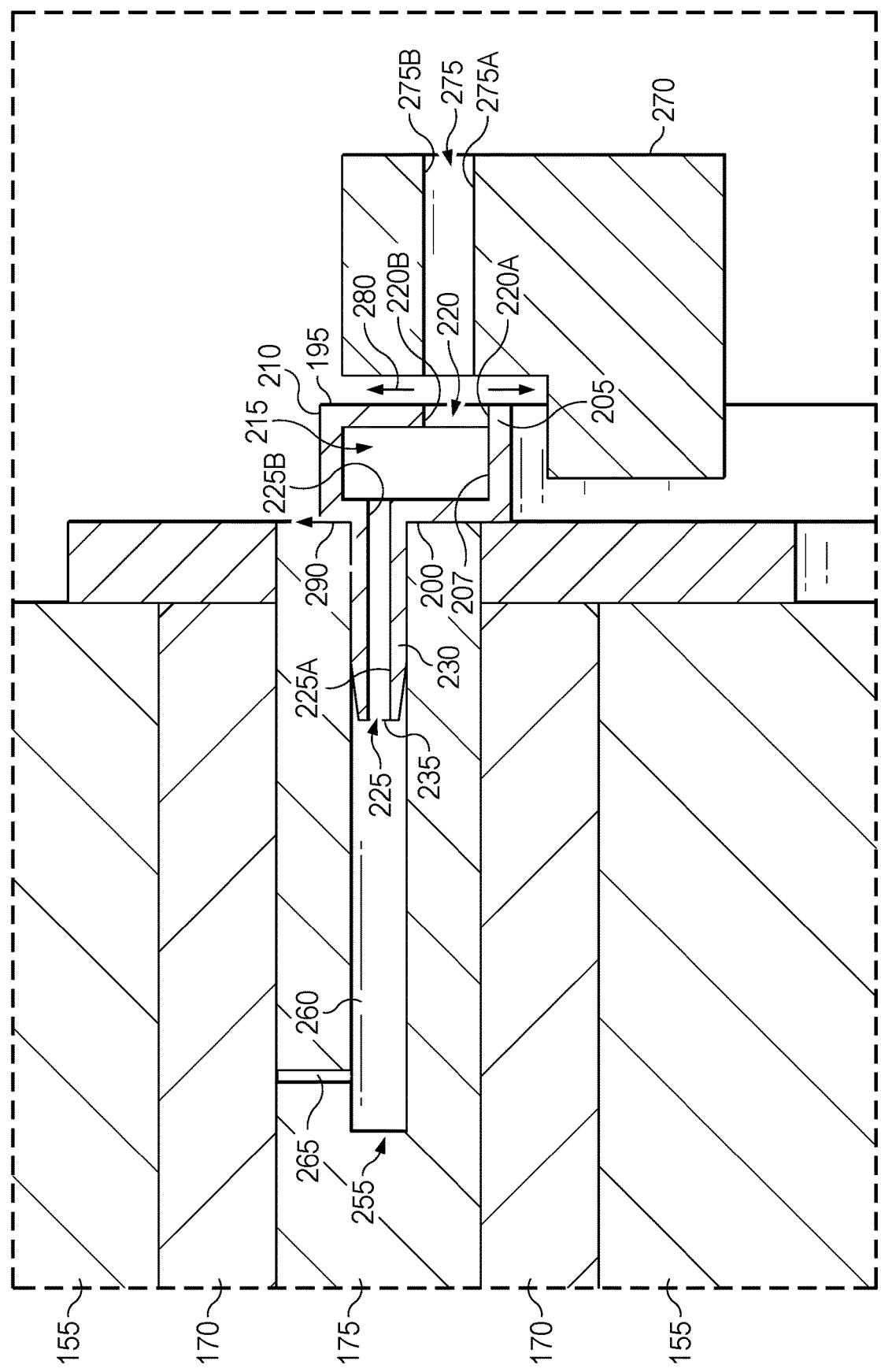

Referring now to FIGS. 4A and 4B, a cross-sectional view of the oil delivery device 180 attached, or assembled, with the planetary carrier 160, the gear shaft 175, the bearing 170, and the planetary gear 155 is provided. The cross-sectional view of FIG. 4A is taken along the line 4A in FIG. 3A. FIG. 4B is an enlarged view of portion 4B in FIG. 4A.

In the embodiment shown, the gear shaft 175 is received axially through the planetary carrier 160 and secured to the planetary carrier 160 as discussed above. The gear shaft 175 has a first end 175A and a second end 175B axially opposing the first end 175A. The planetary carrier 160 has a first side 245 and a second side 250 axially opposing the first side 245. The first end 175A of the gear shaft 175 extends axially through the planetary carrier 160 and is flush with the first side 245 of the planetary carrier 160. The second end 175B of the gear shaft 175 extends away from the second side 250 of the planetary carrier 160 in a direction opposite the first side 245 of the planetary carrier 160. The bearing 170 extends circumferentially about the gear shaft 175 between the second side 250 of the planetary carrier 160 and the second end 175B of the gear shaft 175. The planetary gear 155 extends circumferentially about the bearing 170 along an axial length of the bearing 170.

The gear shaft 175 has an oil bore 255 extending axially through at least a portion of the gear shaft 175. The oil bore 255 extends axially through at least the portion of the gear shaft 175 beginning from the first end 175A of the gear shaft 175. The oil bore 255 is adapted to transport oil received from the oil delivery device 180 through the gear shaft 175 and to the bearing 170. In the embodiment shown, the oil bore 255 has an axial passage 260 and a radial passage 265. The axial passage 260 extends from the first end 175A of the gear shaft 175 axially through at least the portion of the gear shaft 175. The radial passage 265 is in fluid communication with the axial passage 260 and extends radially outward or away from the axial passage 260. The radial passage 265 is positioned axially between the first end 175A and the second end 175B of the gear shaft 175 and along at least the portion of the gear shaft 175. In one or more embodiments a bore diameter of the axial passage 260 is greater than a bore diameter of the radial passage 265.

As further shown in FIGS. 4A and 4B, the oil delivery device 180 attaches to the gear shaft 175 at the first end 175A of the gear shaft 175 such that the second side 200 of the oil delivery device 180 is in contact with the first end of 31 of the gear shaft 175. In one or more embodiments, the oil delivery device 180 is also attached to the planetary carrier 160 via the mounting clip 240 such that the second side 200 of the oil delivery device 180 is in contact with the first side 245 of the planetary carrier 160.

In order to attach or engage the oil delivery device 180 with the gear shaft 175, the nozzle 230 of the oil delivery device 180 is received within, or inserted into, the oil bore 255 of the gear shaft 175 at the first end 175A of the gear shaft 175. As shown, the nozzle 230 is received within the axial passage 260 of the oil bore 255 at the first end 175A of the gear shaft 175. As such, the nozzle 230 also extends axially through the planetary carrier 160. The nozzle 230 extends axially through at least a portion of the oil bore 255. When oil delivery device 180 is attached with the gear shaft 175 such that the nozzle 230 is received within the oil bore 255, the oil outlet port 225 is in fluid communication with the oil bore 255 to communicate oil from the oil delivery device 180 to the oil bore 255.

In order to receive the nozzle 230, the bore diameter of the axial passage 260 is greater than an outer diameter of the nozzle 230. In one or more embodiments, the engagement between the nozzle 230 and the axial passage 260 may be a tolerance fit.

With continued reference to FIGS. 4A and 4B, the structure of the oil delivery device 180 will be described in more detail with respect to its cross-section. As shown, the oil inlet opening 220 has an inner radial end 220A and an outer radial end 220B defining the radial height of the oil inlet opening 220. The oil outlet port 225 also has an inner radial end 225A and an outer radial end 225B defining the radial height of the oil outlet port 225. In the embodiment shown, the oil outlet port 225 is positioned radially closer to the outer surface 210 of the oil delivery device 180 than the oil inlet opening 220 and the oil inlet opening 220 is positioned radially closer to the inner surface 205 of the oil delivery device 180 than the oil outlet port 225.

As further shown, the inner radial end 225A of the oil outlet port 225 is positioned radially above the outer radial end 220B of the oil inlet opening 220 defined through the first side 195 of the oil delivery device 180 such that the oil outlet port 225 and the oil inlet opening 220 are radially spaced apart, or radially offset, from each other. In other words, the first side 195 of the oil delivery device 180 extends radially inward from the outer surface 210 to a point radially below the inner radial end 225A of the oil outlet port 225.

In one or more embodiments, the inner radial end 225A of the oil outlet port 225 and the outer radial end 220B of the oil inlet opening 220 may be at the same radial height such that the inner radial end 225A and the outer radial end 220B are axially aligned. In such embodiments, the first side 195 of the oil delivery device 180 extends radially inward from the outer surface 210 to a point axially aligned with the inner radial end 225A.

Each of the first side 195 and the second side 200 of the oil delivery device 180 has an axial thickness. In one or more embodiments, the axial thickness of each of the first side 195 and the second side 200 is the same such that the oil reception chamber 215 is centered axially with respect to the first side 195 and the second side 200 of the oil delivery device 180. In one or more other embodiments, one side may have an axial thickness greater than the other.

Each of the inner surface 205 and the outer surface 210 of the oil delivery device has a radial thickness. In one or more embodiments, the radial thickness of each of the inner surface 205 and the outer surface 210 is the same such that the oil reception chamber 215 is centered radially with respect to the inner surface 205 and the outer surface 210 of the oil delivery device 180. In one or more other embodiments, the inner surface 205 may have a radial thickness that is less than the radial thickness of the outer surface 210. In the embodiment shown, an interior surface 207 of the inner surface 205, which defines the radially inner extent of the oil reception chamber 215, is flush with the inner radial end 220A of the oil inlet opening 220.

With continued reference to FIGS. 4A and 4B, the power transmission system 120 further includes an oil supply device 270 having an oil supply port 275 that supplies oil to the oil delivery device 180. The oil supply device 270 is in communication with the oil pump 135. The oil pump 135 pumps oil to the oil supply device 270, which supplies oil to the oil delivery device 180 via the oil supply port 275. The oil pump 135, the oil supply device 270, and the oil delivery device 180 may collectively be referred to as an oil supply system 285.

The oil supply device 270 shown in FIGS. 4A and 4B is shown as a generic structure. The oil supply device 270 may taken any shape or design as required for a particular application. In this disclosure, only the position and size of the oil supply port 275 relative to the oil inlet opening 220 of the oil delivery device 180 will be described.

The oil supply device 270 is static and thus does not directly contact the oil delivery device 180, which is rotating with the planetary carrier 160. Thus, in order to efficiently deliver oil to the oil delivery device 180, the oil supply port 275 is positioned proximate to, but axially spaced from, the oil inlet opening 220. The axial spacing of the oil supply port 275 from the oil inlet opening 220 defines a first leak passage 280 through which oil may escape radially outward or radially inward between the oil delivery device 180 and the oil supply device 270. However, the improvements to the structure of the oil delivery device 180 reduce the incidence of such leakage and facilitates efficient delivery of the oil to the bearing 170.

As described, the oil supply port 275 is positioned proximate the oil inlet opening 220. The oil supply port 275 has an inner radial end 275A and an outer radial end 275B. The outer radial end 275B of the oil supply port 275 and the outer radial end 220B of the oil inlet opening 220 are radially spaced from the axis 190 an equal distance such that the outer radial end 275B and the outer radial end 220B are axially aligned. The inner radial end 275A of the oil supply port 275 is positioned radially further from the axis 190 than the inner radial end 220A of the oil inlet opening 220 such that the radial height of the oil inlet opening 220 is greater than a radial height of the oil supply port 275, which facilitates the reception of oil by the oil delivery device 180 from the oil supply device 270 and reduces the incidence of oil leaking out through the first leak passage 280.

As mentioned above, the oil supply device 270 is static whereas the oil delivery device 180 is rotating. In one or more embodiments, the oil supply port 275 is positioned at one point circumferentially about the axis 190 and relative to the oil delivery device 180, which may be a high point of the oil delivery device 180 relative to the ground. As such, oil exiting the oil supply port 275 of the oil supply device 270 will tend to drop downward, or radially inward relative to the axis 190, due to gravity. The positioning of the inner radial end 220A of the oil inlet opening 220 below, or radially inward of, the oil supply port 275 enables the oil inlet opening 220 to catch and receive a higher percentage of the oil exiting the oil supply port 275.

In addition, the presence of the inner surface 205 below, or radially inward of, the oil supply port 275 greatly improves the ability of the oil delivery device 180 to catch and retain the oil as it is initially received from the oil supply port 275. The inner surface 205 serves as a barrier to retain the oil within the oil reception chamber 215. Furthermore, the presence of the inner surface 205 and the positioning of the oil delivery device 180 relative to the oil supply port 275 results in the oil reception chamber 215 not being in direct fluid communication with larger leakage areas; rather, the oil reception chamber 215 is separated from those areas by the narrow first leak passage 280.

Once oil is received by the oil delivery device 180 within the oil reception chamber 215, the oil is forced radially outward as a result of the centrifugal force created by the rotation of the oil delivery device 180. At a radially outer portion of the oil reception chamber 215, the oil is retained within, and bounded by the outer surface 210, the first side 195, and the second side 200. For this reason, the oil outlet port 225 is positioned radially further from the axis 190 than the oil inlet opening 220.

From the oil reception chamber 215, the oil exits the oil delivery device 180 through the oil outlet port 225 and through the nozzle 230 to the nozzle outlet 235. From the oil outlet port 225, the oil flows through the oil bore 255 of the gear shaft 175. The oil travels through the axial passage 260 toward the radial passage 265. Once the oil reaches the radial passage 265, the centrifugal force created by the rotation of the oil delivery device 180 and the planetary carrier 160 forces the oil radially outward through the radial passage 265. From the radial passage 265, the oil exits the gear shaft 175 and is delivered to the bearing 170 to provide lubrication and cooling to the bearing 170.

Between the nozzle 230 and the oil bore 255, a second leak passage 290 is defined and through which oil may leak. Oil that manages to leak out through the first leak passage 280 and through the second leak passage 290 is not directly received by the bearing 170. This leaked oil falls down to the bottom of the housing of the transmission 125 or differential 130 within which the planetary gear assembly 140 is housed. Additionally, the oil that is delivered directly to the bearing 170 will also ultimately fall down to the bottom of the housing. The oil in the housing, whether it is the leaked portion of the oil or the portion of the oil delivered directly to the bearing 14, is then recirculated back to the oil pump 135 and will ultimately be recirculated back to the oil delivery device 180.

It will be readily apparent to one of ordinary skill in the art that the greater the percentage of oil that reaches the bearing 170 from the oil supply device 270, the greater the benefit that the bearing 170 will realize. The oil delivery device 180 and the oil delivery system described above provides such an improvement as compared to systems and devices of the prior art. The devices and systems described above significantly improve the ability of the oil delivery device 180 to receive, retain, and deliver a greater percentage of oil to the bearing 170 and other moving components of the planetary gear assembly 140.

Figure 4C:
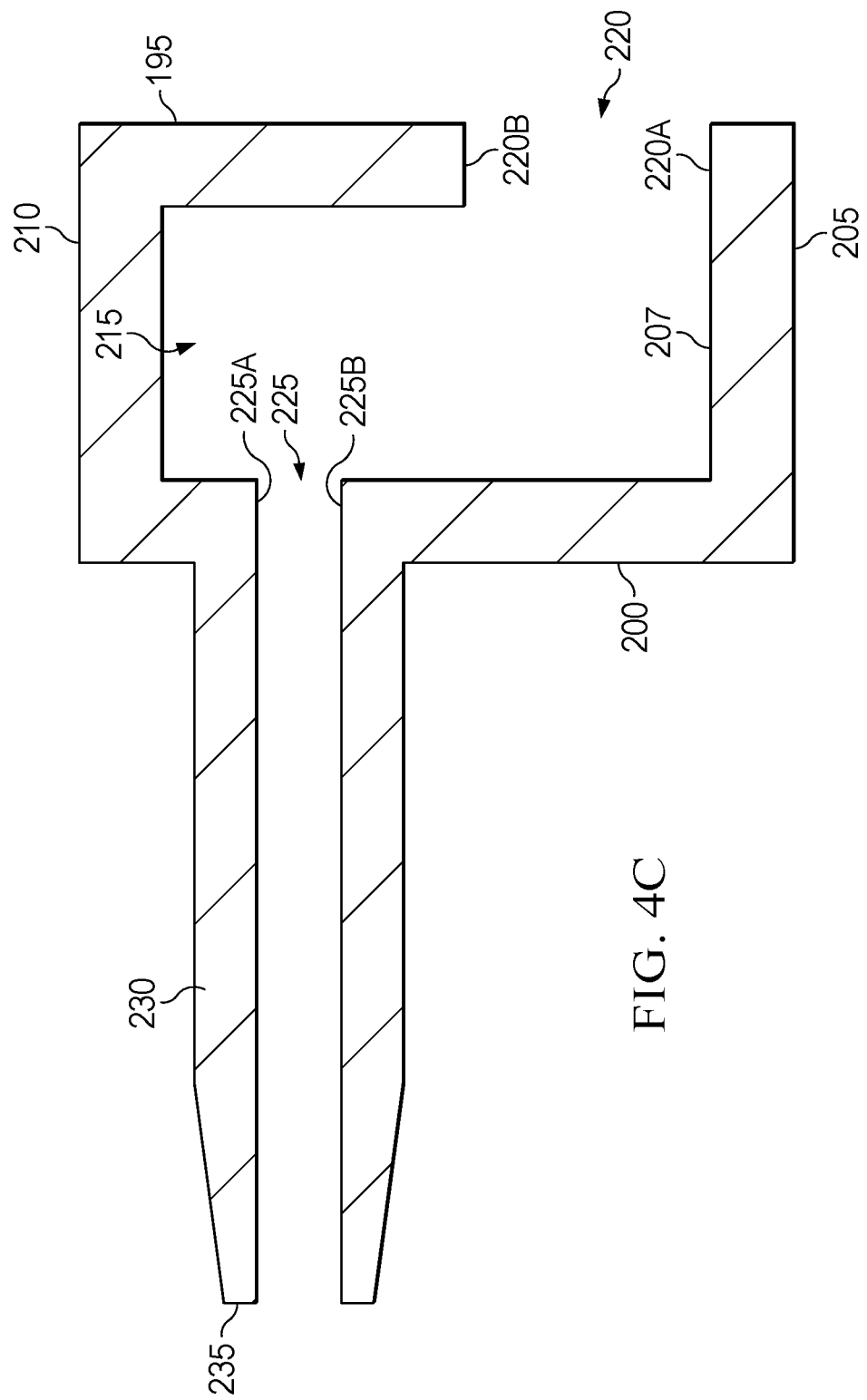
FIG. 4C illustrates a slice view of a portion of the oil delivery device, according to one or more embodiments.

Referring to FIG. 4C, an illustration of a slice of the oil delivery device 180, taken along the line 4C in FIG. 3A, is provided.

As discussed above, prior art devices have been known to deliver only about a third of the supplied oil to the desired component. In an example, at 100 C oil temperature and 39 kph operating condition, the oil delivery device 180 and the oil delivery system described above was able to deliver 83% of the oil supplied from the oil supply device 270 to the bearing 170 and other moving components of the planetary gear assembly 140. As such, a significant reduction in oil leakage was realized.

The present disclosure also introduces an oil delivery system, the oil delivery system including: a planetary gear assembly including: a central gear attached to a power transmission shaft; a planetary carrier coaxially aligned with the central gear; and a planetary gear rotatably attached to a gear shaft via a bearing and rotatably engaged with the central gear, the gear shaft being attached to an oil delivery device via an oil bore defined within the gear shaft; and the oil delivery device attached to the planetary carrier such that the oil delivery device, the planetary carrier, and the gear shaft rotate together, the oil delivery device having a disk shape with an inner diameter and an outer diameter and further including: a first side wall and a second side wall, the first and second side walls being axially spaced apart from each other, each of the first and second side walls defining the inner and outer diameter of the oil delivery device; an interior surface extending between the first side wall and the second side wall at the inner diameter of the oil delivery device; an exterior surface extending between the first side wall and the second side wall at the outer diameter of the oil delivery device; an oil reception chamber defined within the oil delivery device between the first and second side walls and between the interior and exterior surfaces of the oil delivery device; an oil inlet opening extending axially through the first side wall, the oil inlet opening in fluid communication with the oil reception chamber and being adapted to receive oil from an oil supply port positioned adjacent the oil inlet opening; an oil outlet port extending axially through the second side wall, the oil outlet port being adapted to communicate the oil from the oil reception chamber to the gear shaft and the bearing; and a nozzle extending axially from the second side wall and in fluid communication with the oil outlet port, the nozzle being received within the oil bore of the gear shaft to facilitate attachment of the gear shaft to the oil delivery device and to facilitate the communication of the oil from the oil reception chamber to the gear shaft and the bearing. In one embodiment, the oil inlet opening and the oil outlet port are radially spaced apart such that the oil inlet opening and oil outlet port are not axially aligned with each other. In one embodiment, the oil inlet opening is positioned radially inward relative to the oil outlet port. In one embodiment, the oil delivery device is axially spaced apart from the oil supply port such that a narrow flow passage is defined between the oil delivery device and the oil supply port; the narrow flow passage extends between the oil delivery device and the oil supply port to a leakage area; and the narrow flow passage restricts oil communication between the oil delivery device and the leakage area. In one embodiment, the oil inlet opening is radially wider than the oil supply port. In one embodiment, a radially outer end of the oil inlet opening is axially aligned with a radially outer end of the oil supply port; and a radially inner end of the oil inlet opening is located radially inward relative to a radially inner end of the oil supply port. In one embodiment, the planetary gear assembly comprises a second planetary gear rotatably attached to a second gear shaft via a bearing and rotatably engaged with the central gear, the second gear shaft being attached to a second nozzle of the oil delivery device via a second oil bore defined within the second gear shaft; the oil delivery device comprises a second oil outlet port extending axially through the second side wall, the second oil outlet port being adapted to communicate at least a portion of the oil from the oil reception chamber to the second gear shaft and the second bearing; the two oil outlet ports are equally distributed circumferentially about the second side wall. In one embodiment, the oil bore extends axially through the center of the gear shaft. In one embodiment, the oil delivery system further includes an oil pump adapted to pump oil to the oil supply port.

The present disclosure also introduces a vehicle, the vehicle including: a motor; a power transmission device operably coupled to the motor and having a planetary gear assembly including: a central gear attached to a power transmission shaft associated with the motor; a planetary carrier coaxially aligned with the central gear; and a planetary gear rotatably attached to a gear shaft via a bearing and rotatably engaged with the central gear, the gear shaft being attached to an oil delivery device via an oil bore defined within the gear shaft; the oil delivery device attached to the planetary carrier such that the oil delivery device, the planetary carrier, and the gear shaft rotate together, the oil delivery device having a disk shape with an inner diameter and an outer diameter and further including: a first side wall and a second side wall, the first and second side walls being axially spaced apart from each other, each of the first and second side walls defining the inner and outer diameter of the oil delivery device; an interior surface extending between the first side wall and the second side wall at the inner diameter of the oil delivery device; an exterior surface extending between the first side wall and the second side wall at the outer diameter of the oil delivery device; an oil reception chamber defined within the oil delivery device between the first and second side walls and between the interior and exterior surfaces of the oil delivery device; an oil inlet opening extending axially through the first side wall, the oil inlet opening in fluid communication with the oil reception chamber and being adapted to receive oil from an oil supply port positioned adjacent the oil inlet opening; an oil outlet port extending axially through the second side wall, the oil outlet port being adapted to communicate the oil from the oil reception chamber to the gear shaft and the bearing; and a nozzle extending axially from the second side wall and in fluid communication with the oil outlet port, the nozzle being received within the oil bore of the gear shaft to facilitate attachment of the gear shaft to the oil delivery device and to facilitate the communication of the oil from the oil reception chamber to the gear shaft and the bearing. In one embodiment, the motor is an internal combustion motor or an electric motor. In one embodiment, the power transmission device is a transmission or a differential. In one embodiment, the oil inlet opening and the oil outlet port are radially spaced apart such that the oil inlet opening and oil outlet port are not axially aligned with each other. In one embodiment, the oil inlet opening is positioned radially inward relative to the oil outlet port. In one embodiment, a radially outer end of the oil inlet opening is axially aligned with a radially outer end of the oil supply port; and a radially inner end of the oil inlet opening is located radially inward relative to a radially inner end of the oil supply port.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. An oil delivery device, comprising:
   a body having a disk shape with an inner diameter and an outer diameter;
   first and second side walls of the body, the first and second side walls defining axially opposing sides of the body and each defining the inner and outer diameter of the oil delivery device;
   an interior surface extending between the first side wall and the second side wall at the inner diameter of the body;
   an exterior surface extending between the first side wall and the second side wall at the outer diameter of the body;
   an oil reception chamber defined within the oil delivery device between the first and second side walls and between the interior and exterior surfaces of the body;
   an oil inlet opening extending axially through the first side wall between the inner and outer diameters and extending circumferentially about the first side wall, the oil inlet opening being in fluid communication with the oil reception chamber; and
   an oil outlet port extending axially through the second side wall, the oil outlet port being in fluid communication with the oil reception chamber and the oil inlet opening.

2. The oil delivery device of claim 1, further comprising:
   a nozzle extending axially from the second side wall in a direction opposite the first side wall and extending circumferentially about the oil outlet port such that the oil outlet port extends axially through the nozzle.

3. The oil delivery device of claim 1,
   wherein the oil inlet opening is radially wider than the oil outlet port.

4. The oil delivery device of claim 1,
   wherein the first side wall extends from the exterior surface radially inward further than the oil outlet port such that the oil inlet opening and the oil outlet port are radially offset from each other.

5. The oil delivery device of claim 1, further comprising:
a plurality of oil outlet ports, including the oil outlet port, extending axially through the second side wall and in fluid communication with the oil reception chamber and the oil inlet opening;
wherein the plurality of oil outlet ports are equally distributed circumferentially about the second side wall.

6. An oil delivery system, comprising:
a planetary gear assembly comprising:
  a central gear attached to a power transmission shaft;
  a planetary carrier coaxially aligned with the central gear; and
  a planetary gear rotatably attached to a gear shaft via a bearing and rotatably engaged with the central gear, the gear shaft being attached to an oil delivery device via an oil bore defined within the gear shaft; and
the oil delivery device having a disk shape and being attached to the planetary carrier such that the oil delivery device, the planetary carrier, and the gear shaft rotate together, the oil delivery device comprising:
  first and second walls axially spaced apart from each other;
  third and fourth walls radially spaced apart from each other, the third wall extending between the first and second walls at an inner diameter of the oil delivery device, and the fourth wall extending between the first and second walls at an outer diameter of the oil delivery device;
  an oil reception chamber defined within the oil delivery device;
  an oil inlet opening extending axially through the first wall; and
  an oil outlet port extending axially through the second wall.

7. The oil delivery system of claim 6, the oil delivery device further comprising:
a nozzle extending axially from the second wall, the oil outlet port extending axially through the nozzle such that the nozzle and the oil inlet opening are in fluid communication via the oil reception chamber, wherein the nozzle is received within the oil bore of the gear shaft.

8. The oil delivery system of claim 7,
wherein the planetary gear assembly comprises a second planetary gear rotatably attached to a second gear shaft via a bearing and rotatably engaged with the central gear, the second gear shaft being attached to a second nozzle of the oil delivery device via a second oil bore defined within the second gear shaft;
wherein the oil delivery device comprises a second oil outlet port extending axially through the second nozzle and the second wall such that the second nozzle and the oil inlet opening are in fluid communication via the oil reception chamber; and
wherein the first and second oil outlet ports are equally distributed circumferentially about the second wall.

9. The oil delivery system of claim 6,
wherein the oil inlet opening and the oil outlet port are radially spaced apart such that the oil inlet opening and oil outlet port are not axially aligned with each other.

10. The oil delivery system of claim 9,
wherein the oil inlet opening is positioned radially inward relative to the oil outlet port.

11. The oil delivery system of claim 6, further comprising:
an oil supply port positioned adjacent the oil inlet opening;
wherein the oil delivery device is axially spaced apart from the oil supply port such that a narrow flow passage is defined between the oil delivery device and the oil supply port;
wherein the narrow flow passage extends between the oil delivery device and the oil supply port to a leakage area; and
wherein the narrow flow passage restricts oil communication between the oil delivery device and the leakage area.

12. The oil delivery system of claim 11,
wherein a radially outer end of the oil inlet opening is axially aligned with a radially outer end of the oil supply port; and
wherein a radially inner end of the oil inlet opening is located radially inward relative to a radially inner end of the oil supply port.

13. The oil delivery system of claim 11, further comprising:
an oil pump adapted to pump oil to the oil supply port.

14. The oil delivery system of claim 6,
wherein the oil bore extends axially through a center of the gear shaft.

15. A vehicle, comprising:
a propulsion system;
a power transmission device operably coupled to the propulsion system and having a planetary gear assembly comprising:
  a central gear attached to a power transmission shaft associated with the propulsion system;
  a planetary carrier coaxially aligned with the central gear; and
  a planetary gear rotatably attached to a gear shaft via a bearing and rotatably engaged with the central gear, the gear shaft being attached to an oil delivery device via an oil bore defined within the gear shaft;
the oil delivery device having a disk shape and being attached to the planetary carrier such that the oil delivery device, the planetary carrier, and the gear shaft rotate together, the oil delivery device comprising:
  first and second walls axially spaced apart from each other;
  third and fourth walls radially spaced apart from each other, the third wall extending between the first and second walls at an inner diameter of the oil delivery device, and the fourth wall extending between the first and second walls at an outer diameter of the oil delivery device;
  an oil reception chamber defined within the oil delivery device;
  an oil inlet opening extending axially through the first wall; and
  an oil outlet port extending axially through the second wall.

16. The vehicle of claim 15, the oil delivery device further comprising:
a nozzle extending axially from the second wall, the oil outlet port extending axially through the nozzle such that the nozzle and the oil inlet opening are in fluid communication via the oil reception chamber, wherein the nozzle is received within the oil bore of the gear shaft.

17. The vehicle of claim 15,
wherein the propulsion system includes an internal combustion engine and/or an electric motor; and
wherein the power transmission device is a transmission or a differential.

18. The vehicle of claim 15,
wherein the oil inlet opening and the oil outlet port are radially spaced apart such that the oil inlet opening and oil outlet port are not axially aligned with each other.

19. The vehicle of claim 18,
wherein the oil inlet opening is positioned radially inward relative to the oil outlet port.

20. The vehicle of claim 15, further comprising:
an oil supply port positioned adjacent the oil inlet opening;
wherein a radially outer end of the oil inlet opening is axially aligned with a radially outer end of the oil supply port; and
wherein a radially inner end of the oil inlet opening is located radially inward relative to a radially inner end of the oil supply port.

\* \* \* \* \*